United States Patent
Hayashi (12)

(10) Patent No.: US 6,308,057 B1
(45) Date of Patent: Oct. 23, 2001

(54) RADIO RECEIVER HAVING COMPENSATION FOR DIRECT CURRENT OFFSET

(75) Inventor: Hiroshi Hayashi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/232,013

(22) Filed: Jan. 14, 1999

(30) Foreign Application Priority Data

Jan. 16, 1998 (JP) .................................................. 10-006447

(51) Int. Cl.[7] ........................................................ H04B 1/30
(52) U.S. Cl. ............................ 455/324; 455/86; 455/304; 375/329
(58) Field of Search ............................. 455/324, 86, 304, 455/189.1, 323, 313, 314, 205, 207, 209; 375/344, 345, 329; 329/304, 306, 310

(56) References Cited

U.S. PATENT DOCUMENTS

| 5,249,203 | * | 9/1993 | Loper | ..................................... 455/324 |
| 5,826,180 | * | 10/1998 | Golan | ..................................... 455/302 |
| 5,828,955 | * | 10/1998 | Lipowski et al. | ..................... 455/324 |
| 5,999,802 | * | 12/1999 | Aschwanden | ..................... 455/196.1 |
| 6,115,593 | * | 9/2000 | Alinikula et al. | ..................... 455/324 |
| 6,134,429 | * | 10/2000 | Feyfant et al. | ......................... 455/324 |

* cited by examiner

*Primary Examiner*—Vivian Chang
*Assistant Examiner*—Duc Nguyen
(74) *Attorney, Agent, or Firm*—Venable; Robert J. Frank; Michael A. Sartori (57) ABSTRACT

A radio receiver providing compensation for a direct current offset which includes a first frequency converter for converting a signal received by the receiver to first and second intermediate frequency signals, each signal having an angular frequency $\omega_r$ and being in phase quadrature with respect to each other. All analog-to-digital converter for converting the first and second intermediate frequency signals to first and second intermediate frequency digital signals, each having an angular frequency $\omega_r$ and being in phase quadrature with respect to each other, a direct current offset being generated within the analog-to-digital converter. A second frequency converter for converting the first and second digital signals and the direct current offset to first and second baseband signals, and low pass filters each having a cutoff frequency $\omega_T$ for removing frequency components of the first and second baseband signals which are higher than $\omega_r$.

6 Claims, 12 Drawing Sheets

| ADDRESS | ROM21 | ROM22 |
| --- | --- | --- |
| 0 | $\cos(0\,\pi/5)$ | $\sin(0\,\pi/5)$ |
| 1 | $\cos(1\,\pi/5)$ | $\sin(1\,\pi/5)$ |
| 2 | $\cos(2\,\pi/5)$ | $\sin(2\,\pi/5)$ |
| 3 | $\cos(3\,\pi/5)$ | $\sin(3\,\pi/5)$ |
| 4 | $\cos(4\,\pi/5)$ | $\sin(4\,\pi/5)$ |
| 5 | $\cos(5\,\pi/5)$ | $\sin(5\,\pi/5)$ |
| 6 | $\cos(6\,\pi/5)$ | $\sin(6\,\pi/5)$ |
| 7 | $\cos(7\,\pi/5)$ | $\sin(7\,\pi/5)$ |
| 8 | $\cos(8\,\pi/5)$ | $\sin(8\,\pi/5)$ |
| 9 | $\cos(9\,\pi/5)$ | $\sin(9\,\pi/5)$ |

| ADDRESS | ROM21 | |
|---|---|---|
| 0 | $\cos(0\,\pi/4)$ | $\sin(0\,\pi/4)$ |
| 1 | $\cos(1\,\pi/4)$ | $\sin(1\,\pi/4)$ |
| 2 | $\cos(2\,\pi/4)$ | $\sin(2\,\pi/4)$ |
| 3 | $\cos(3\,\pi/4)$ | $\sin(3\,\pi/4)$ |
| 4 | $\cos(4\,\pi/4)$ | $\sin(4\,\pi/4)$ |
| 5 | $\cos(5\,\pi/4)$ | $\sin(5\,\pi/4)$ |
| 6 | $\cos(6\,\pi/4)$ | $\sin(6\,\pi/4)$ |
| 7 | $\cos(7\,\pi/4)$ | $\sin(7\,\pi/4)$ |

| | I | Q |
|---|---|---|
| 0 π/2 | I' | Q' |
| 1 π/2 | −Q' | I' |
| 2 π/2 | −I' | −Q' |
| 3 π/2 | Q' | −I' |

| PHASE | I | Q |
|---|---|---|
| 0π/2 | I' | Q' |
| 2π/2 | −I' | −Q' |

FIG. 12

RADIO RECEIVER HAVING COMPENSATION FOR DIRECT CURRENT OFFSET

BACKGROUND OF THE INVENTION

1. Field of the Invention

This invention relates to a radio receiver including frequency conversion means for compensating for a DC offset introduced by analog-to-digital conversion of an intermediate frequency (IF) signal generated within the receiver.

2. Description of the Background Art

In radio receivers employing digital modulation, such as PSK modulation (phase shift keying modulation), FSK modulation (frequency shift keying modulation), and ASK modulation (amplitude shift keying modulation), the receiver converts a received signal, which is to be demodulated, into a digital signal and then decodes the digital signal. In general, since the received signal has a high frequency bandwidth (e.g. 800 MHz or 1.9 GHz) at a carrier frequency, the radio receiver removes the carrier from the received signal and converts it to an intermediate frequency (IF) signal having a frequency which is lower than the carrier frequency prior to decoding. The IF signal is then converted from an analog signal into a digital signal by use of an analog/digital converter.

However, the output of the analog/digital converter has a noise component in the form of a direct current offset which is added to the digital signal. The direct current offset has the effect of deteriorating the accuracy with which the digital signal is decoded. As a result, it is necessary to compensate for the direct current offset to assure accurate decoding of the received signal.

In a conventional method of compensating for the direct current offset, the radio receiver measures the magnitude of the direct current offset. Based on the result of this measurement, the receiver controls and adjusts the level of the digital signal. Specifically, the receiver compensates for the direct current offset in the digital signal by using a well-known feedback loop control. However, it is difficult and time consuming to design and adjust the feedback loop since the designer of the circuit must take into account the stability and response time thereof. Further, since, the feedback loop control circuit is complicated, a radio receiver having a feed back loop is relatively large in size and consumes relatively large amounts of power.

SUMMARY OF THE INVENTION

Therefore, it is an object of the present invention to provide a radio receiver which positively compensates for a direct current offset without using a complicated circuit such as a feedback loop. It is another object of the present invention to provide a radio receiver capable of not only compensating for the direct current offset but also having a quick response.

To accomplish these objectives, a radio receiver is provided which comprises a first frequency converting means for converting a signal received by the receiver to first and second intermediate frequency signals, each having an angular frequency $\omega_r$ and being in phase quadrature with respect to each other;

an analog-to-digital converting means for converting the first and second intermediate frequency signals to first and second intermediate frequency digital signals, each having an angular frequency $\omega_r$ and being in phase quadrature with respect to each other, a direct current offset being generated within the analog-to-digital converting means;

a second frequency converting means for converting the first and second digital signals and the direct current offset to first and second baseband signals; and low pass filtering means having a cutoff frequency $\omega_r$ for removing frequency components of said first and second baseband signals which are higher than $\omega_r$.

BRIEF DESCRIPTION OF THE DRAWINGS

These and other objects and features of the present invention will become more apparent form consideration of the following detailed description taken in conjunction with the accompanying drawings in which:

FIGS. 3 (*a*), (*b*), (*c*), (*d*) and (*e*) are graphs showing amplitude spectra as a function of regular frequency for the first embodiment of the invention;

DESCRIPTION OF THE PREFERRED EMBODIMENTS

The first embodiment of the invention will be explained below in more detail with reference to the accompanying drawings.

Figure 1:
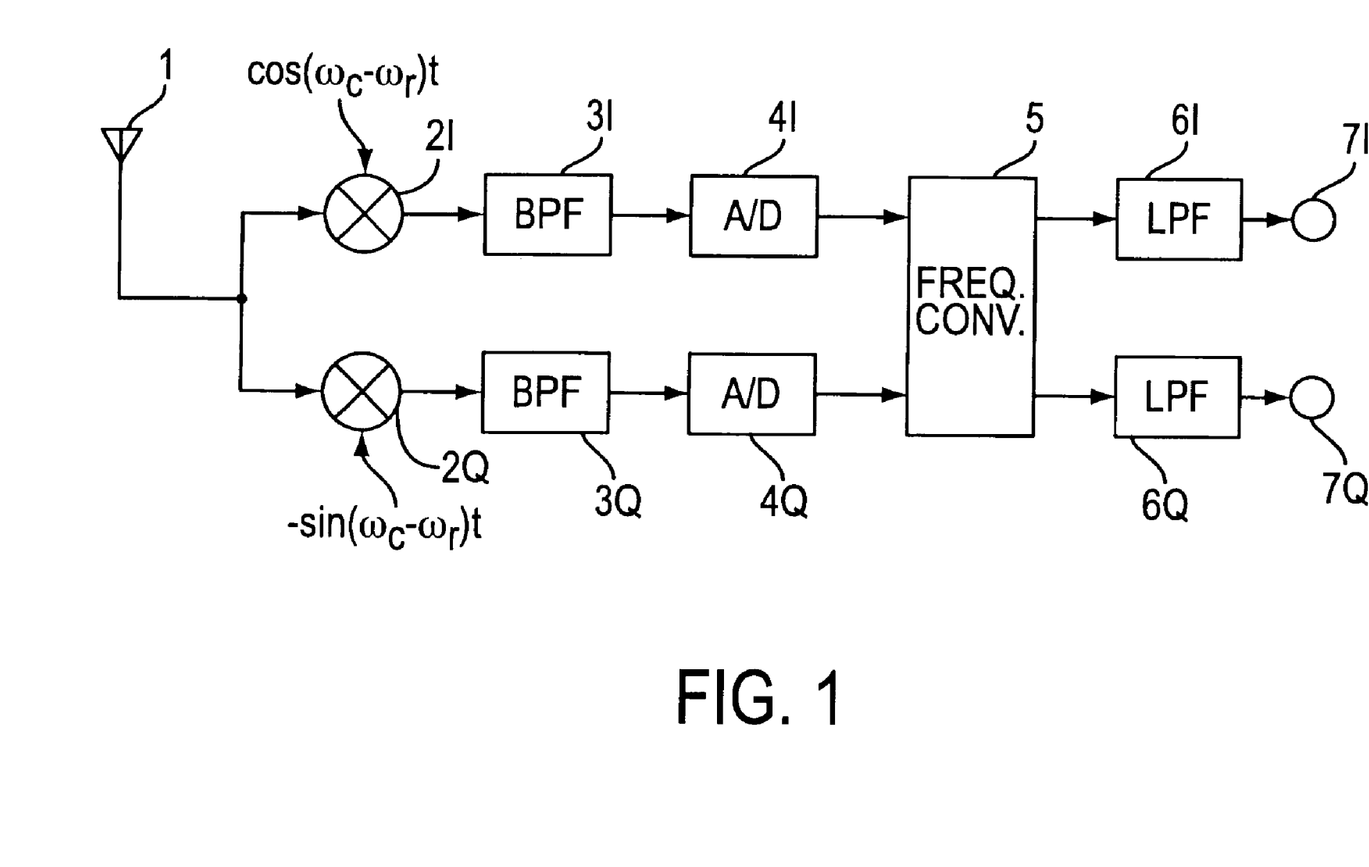
FIG. 1 is a block diagram showing the construction of a radio receiver which includes a frequency converter circuit.
Figure 2:
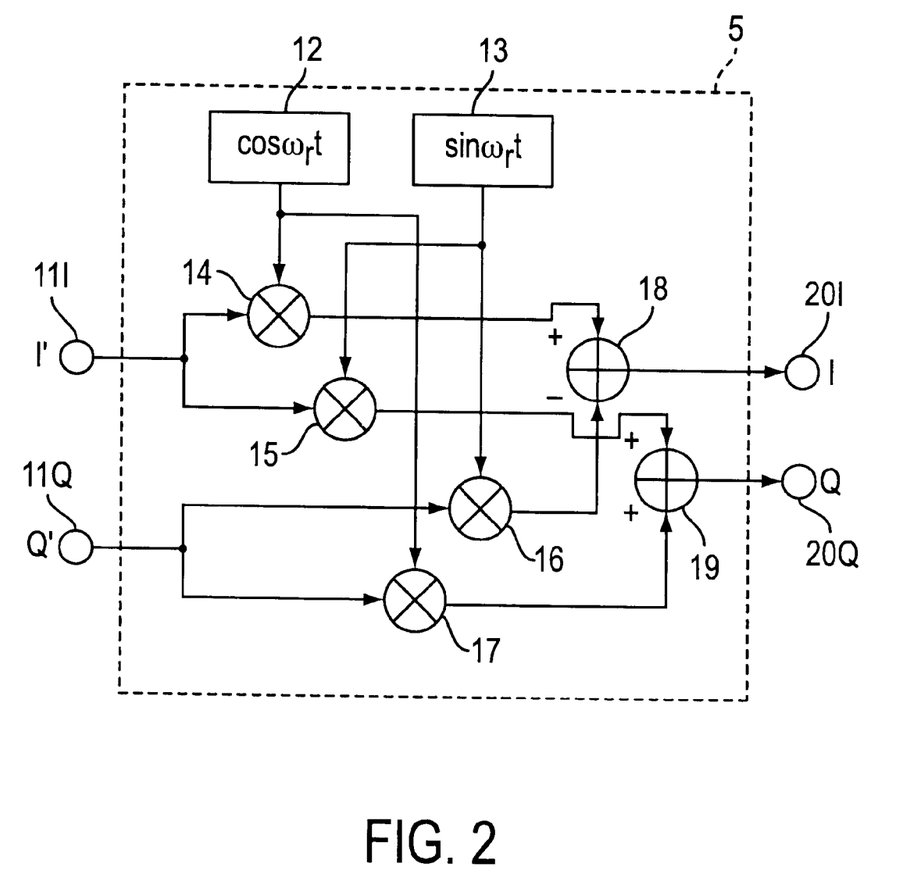
FIG. 2 is a block diagram showing a first embodiment of the frequency converter circuit of FIG. 1.

FIG. 1 shows a radio receiver and FIG. 2 shows the circuit of a frequency converter 5 according to a first embodiment of the invention. In FIG. 1, the radio receiver includes an antenna 1, frequency mixers 2I and 2Q, band pass filters 3I and 3Q, analog/digital converters 4I and 4Q, a frequency converter 5, low pass filters 6I and 6Q and output terminals 7I and 7Q. A signal received by the antenna 1 is applied to both frequency mixers 2I and 2Q. In an actual radio receiver, pre-amplifiers and band pass filters would be interposed between the antenna 1 and the frequency mixers 2I and 2Q but have been omitted from this description for clarity.

The frequency mixer 2I mixes the received signal and an in-phase oscillation signal cos $(\omega_c - \omega_r)t$, where $\omega_c$ is the angular frequency of the carrier and $\omega_r$ is the angular frequency of the oscillation signal. The in-phase oscillation signal is produced by a local oscillator (not shown) to produce a first intermediate frequency (IF) signal. The frequency mixer 2Q mixes the received signal and a quadrature oscillation signal -sin ($\omega_c-\omega_r$)t which is obtained by phase-shifting the in-phase oscillation signal through 90 degrees by means of a phase shifter (not shown) to produce a second IF signal. The first and second IF signals have the same frequency and are in quadrature with respect to each other. Typically, the IF signal frequency would be in the 80 megahertz band.

The band pass filters 3I and 3Q, which have a center frequency $\omega_r$, remove higher harmonics and other undesired frequency components contained in the first and second IF signals respectively. The analog/digital converters 4I and 4Q convert the IF signals to respective digital signals, the sampling rate of the analog/digital converts 4I and 4Q being selected to satisfy the Nyquist sampling criteria. When the first and second IF signals are converted to digital signals, a DC offset is included in each of the digital signals due to the characteristics of the analog/digital converts 4I and 4Q. The frequency converter 5 converts the digital signals, including the DC offsets, to baseband signals. In this frequency conversion, the DC offsets included in the digital signal are also converted to baseband signals. The low pass filters 6I and 6Q, each having a cut-off frequency which is less than $\omega_c$ remove higher harmonics and other undesired frequency components contained in the baseband signals.

If the received signal is a PSK modulated signal, FSK modulated signal, or ASK modulated signal, the received signal is decoded by a decoder (not shown) which is connected to the output terminals 7I and 7Q to provide voice and data signals.

FIG. 2 shows the circuit of the first embodiment of the frequency converter 5 which has input terminals 11I and 11Q, a cosine wave oscillator 12, a sine wave oscillator 13, multipliers 14, 15, 16 and 17, subtractor 18, adder 19 and output terminals 20I and 20Q. The cosine wave oscillator 12 generates a cosine wave signal having the same angular frequency $\omega_r$ as the first and second IF signals and provides this signal to the multipliers 14 and 17. The sine wave oscillator 13 generates a sine wave signal also having the same angular frequency as the first and second IF signals and provides it to the multipliers 15 and 16.

The multiplier 14 multiplies the digital signal provided by the A/D converter 4I by the cosine wave signal and then provides an output signal to the subtractor 18. The multiplier 15 multiplies the digital signal provided by the A/D converter 4I by the sine wave signal and provides an output signal to the adder 19. The multiplier 16 multiplies the digital signal Q' provided by the A/D converter 4Q to input terminal 11Q by the sine wave signal and provides an output signal to the subtractor 18. The multiplier 17 multiplies the digital signal provided by the A/D converter 4Q by the cosine wave signal and provides an output signal to the adder 19.

The subtractor 18 subtracts the output signal provided by the multiplier 16 from the output signal provided by the multiplier 14 and supplies an output signal "I" to the low pass filter 6I via the output terminal 20I. The adder 19 adds the output signal provided by the multiplier 15 to the output signal provided by the multiplier 17 and supplies an output signal "Q" to the low pass filter 6Q via the output terminal 20Q.

The output signal "I" is given by the equation $$I=I' \cos \omega_r t - Q' \sin \omega_r t \quad (1)$$

and the output signal "Q" is given by the equation $$Q=I' \sin \omega_r t + Q' \cos \omega_r t \quad (2)$$

where I' is the signal input to input terminal 11I provided by the A/D converter 4I, and Q' is the signal input to input terminal 11Q provided by the A/D converter 4Q.

In operation, the radio receiver of FIG. 1 receives a signal at antenna 1. This signal is converted to first and second IF signals having in-phase and quadrature components respectively by the mixers 2I and 2Q. Higher harmonics and other undesired frequency components are removed by the band pass filters 3I and 3Q and the desired signal components converted to digital signals by the A/D converter 4I and 4Q. Due to the A/D conversion, each of the digital signals includes a DC offset.

Referring to the internal operation of the frequency converter 5 shown in FIG. 2, the digital signal provided by the A/D converter 4I is supplied to the input terminal 11I. Simultaneously, the digital signal provided by the A/D converter 4Q is supplied to the input terminal 11Q. In the multiplier 14, the digital signal having an in-phase component is multiplied by the cosine wave signal generated by the cosine generator 12 and is output to a first terminal by the subtractor 18. In the multiplier 16, the digital signal having a quadrature component is multiplied by the sine wave signal and is output to a second terminal of the subtractor 18. The subtractor 18 subtracts the output signal of the multiplier 16 from the output signal of the multiplier 14 and outputs the in-phase baseband signal to the low pass filter 6I via the output terminal 20I. Similarly, in the multiplier 15, the digital signal having an in-phase component is multiplied by the sine wave signal generated by the sine generator 13 and is output to a first terminal of the adder 19. In the multiplier 17, the digital signal having a quadrature component is multiplied by the cosine wave signal and is output to a second terminal of the adder 19. The adder 19 adds the output signal of the multiplier 17 to the output signal of the multiplier 15 and outputs the quadrature baseband signal to the low pass filter 6Q via the output terminal 20Q. The low pass filters 6I and 6Q remove higher harmonics and other undesired frequency components from the in-phase and quadrature baseband signals.

FIGS. 3(a) to 3(e) show amplitude spectra as functions of angular frequency for the in phase channel of FIG. 1 having an output at terminal 7I. FIGS. 3(a) to 3(e) also show the spectra for the quadrature channel of FIG. 1 having an output at terminal 7Q since the two spectra are identical.

Figure 3A:
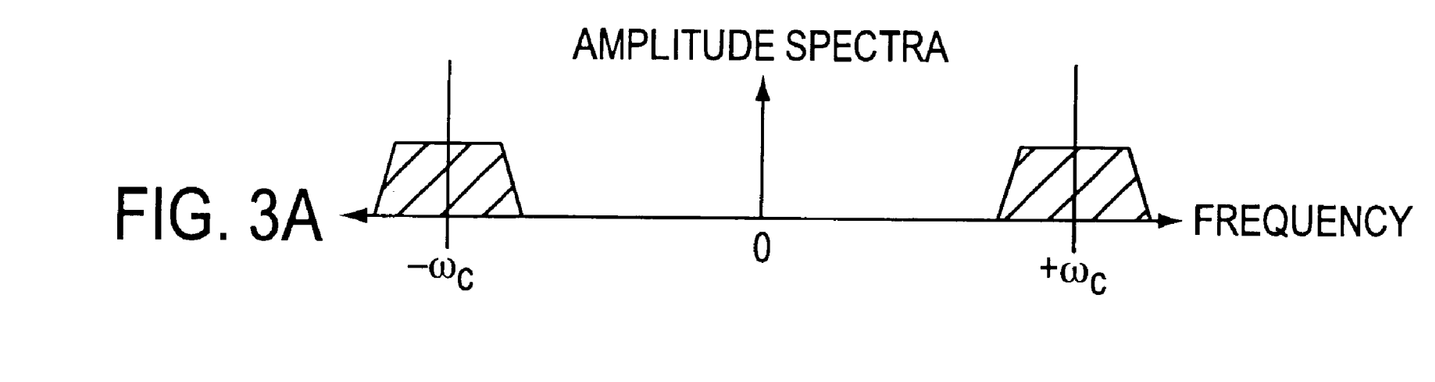
Figure 3B:
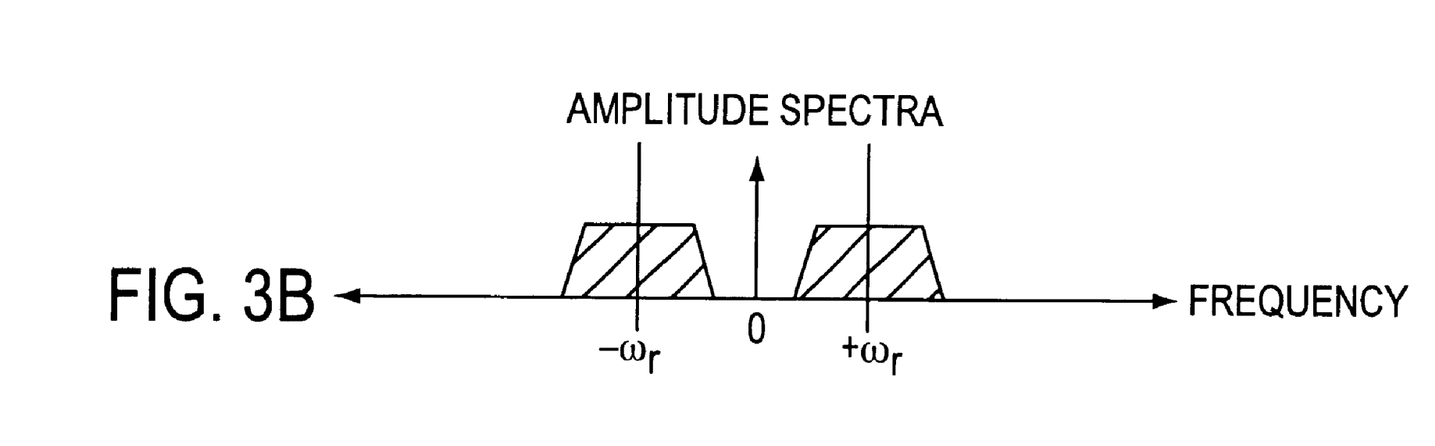
Figure 3C:
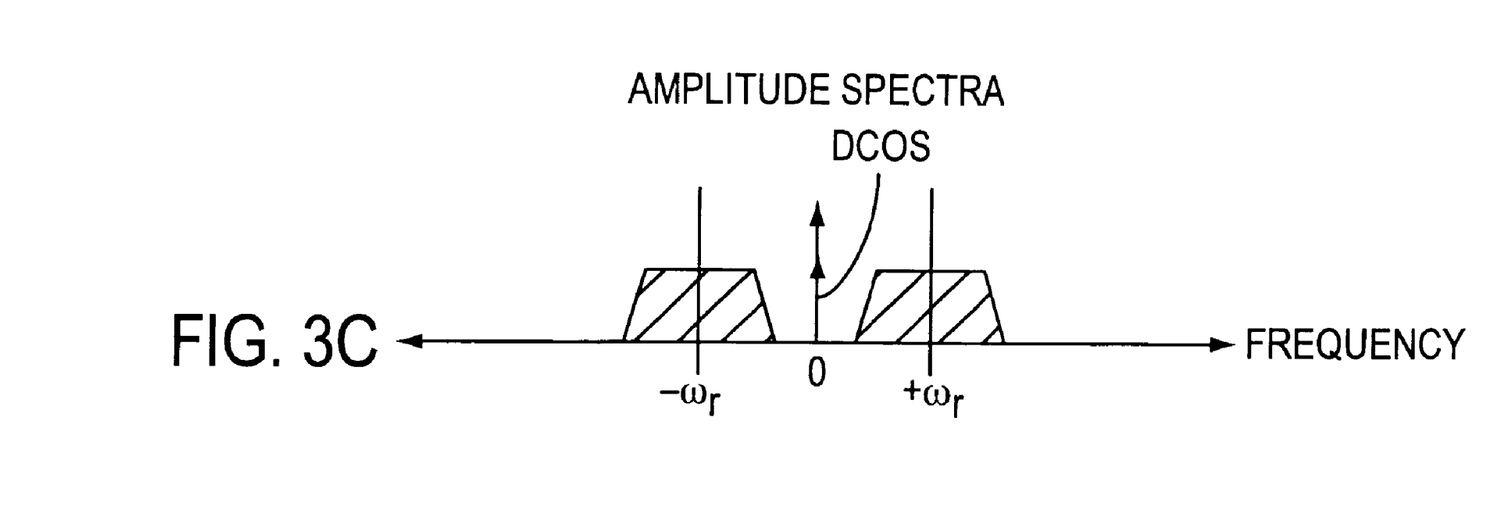
Figure 3D:
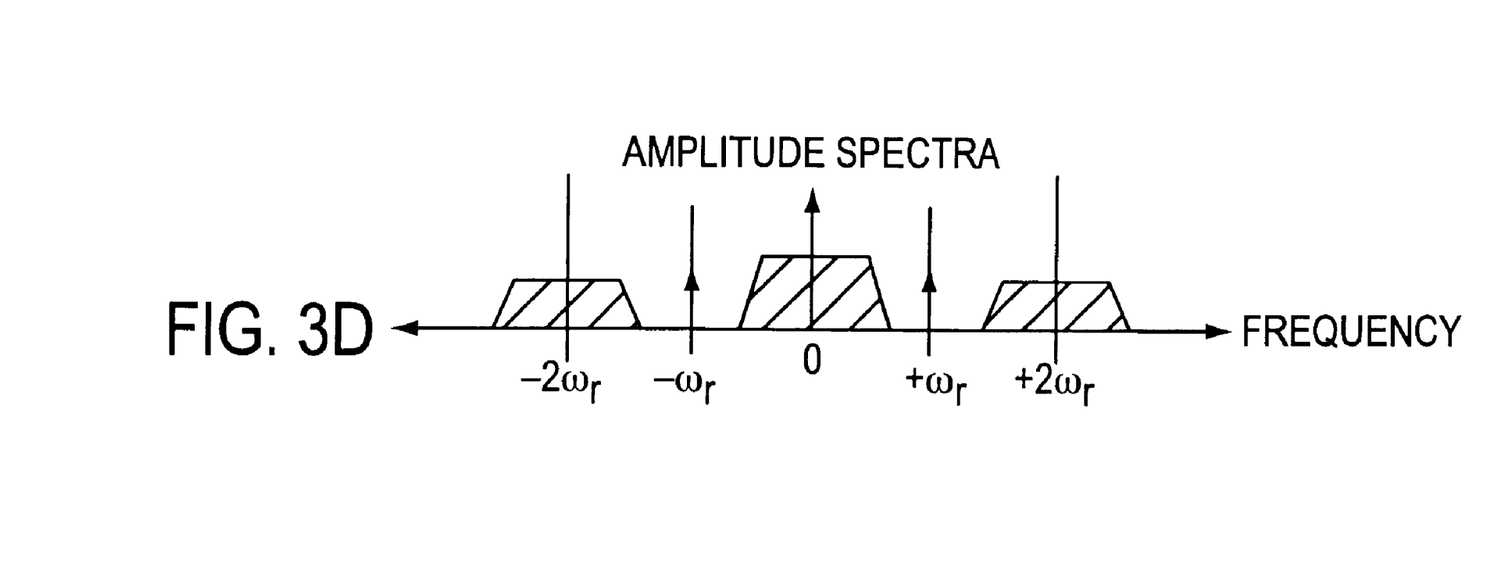
Figure 3E:
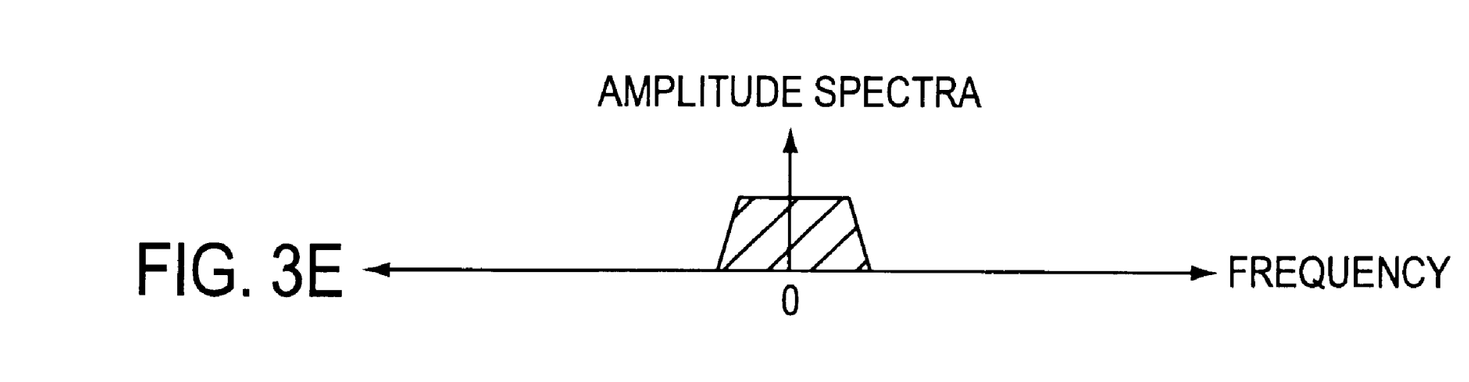

In FIG. 3(a), the signal received from the antenna 1 has center angular frequencies $\pm \omega_c$ and bandwidths which are determined by the modulation on the received signal. The received signal is converted to first and second IF signals by mixers 2I and 2Q which are then filtered by filters 3I and 3Q respectively. The output signals of filters 3I and 3Q have center angular frequencies $\pm \omega_r$ and angular frequency band widths due to the modulation on the received signal, as shown FIG. 3(b). The output signals of the filters 3I and 3Q are converted to digital signals by the A/D converters 4I and 4Q, a DC offset component DCOS being added to each digital signal, as shown in FIG. 3(c). The digital signals having the DC offsets are converted to baseband signals by the frequency converter 5, the baseband signals having center angular frequencies $\pm 2\omega_r$, $\pm \omega_r$, and 0 and frequency bandwidths, as shown FIG. 3(d). That is, the baseband signal includes a component of the desired baseband signal having a center frequency 0, a component of the higher harmonics having center frequencies $\pm 2\omega_r$ and a DC offset DCOS component having a center frequency $\pm \omega_r$.

The baseband signals are supplied to the low pass filters 6I and 6Q respectively. The filters 6I and 6Q remove the higher harmonics components having center angular frequencies $\pm 2\omega_r$, the components having center angular frequencies $\pm \omega_r$ by using low pass filtering having a cut-off frequency $\omega_r$, and output baseband signals from which the DC offset components have been removed, as shown FIG. 3(e).

Figure 4:
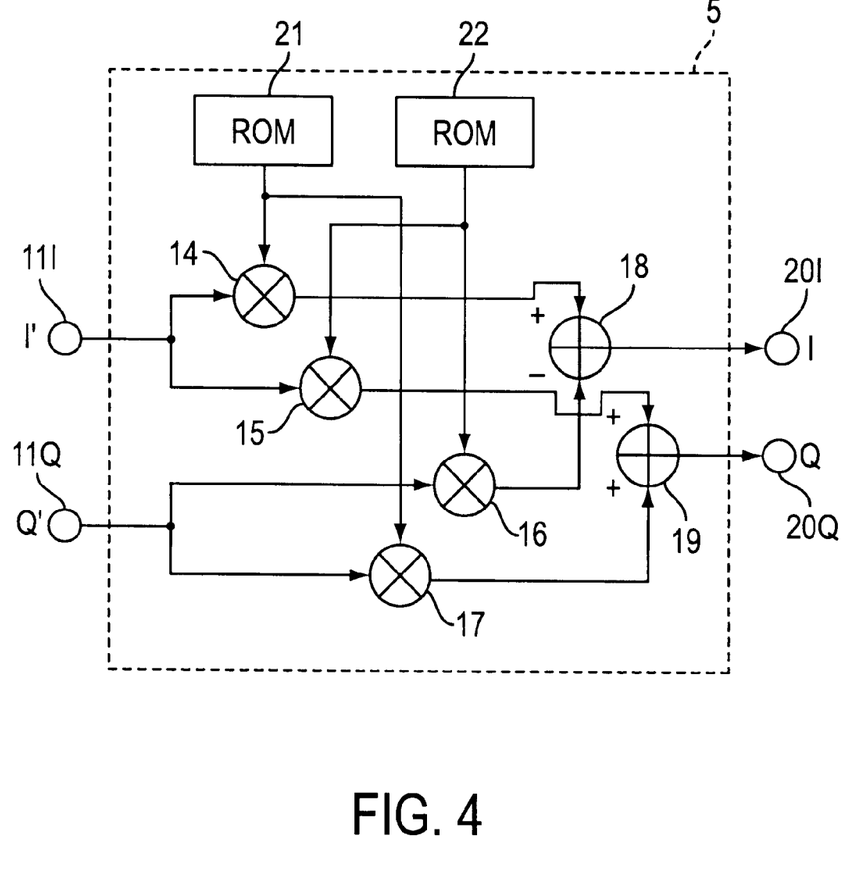
FIG. 4 is a block digram showing a second embodiment of the frequency converter circuit.

FIG. 4 shows the circuit of a second embodiment of the frequency converter 5. The frequency converter of FIG. 4 according to the second embodiment differs from the first embodiment of FIG. 2 in that it employs a cosine ROM 21 and a sine ROM 22 instead of the cosine generator 12 and sine generator 13 of FIG. 2.

Figure 5:
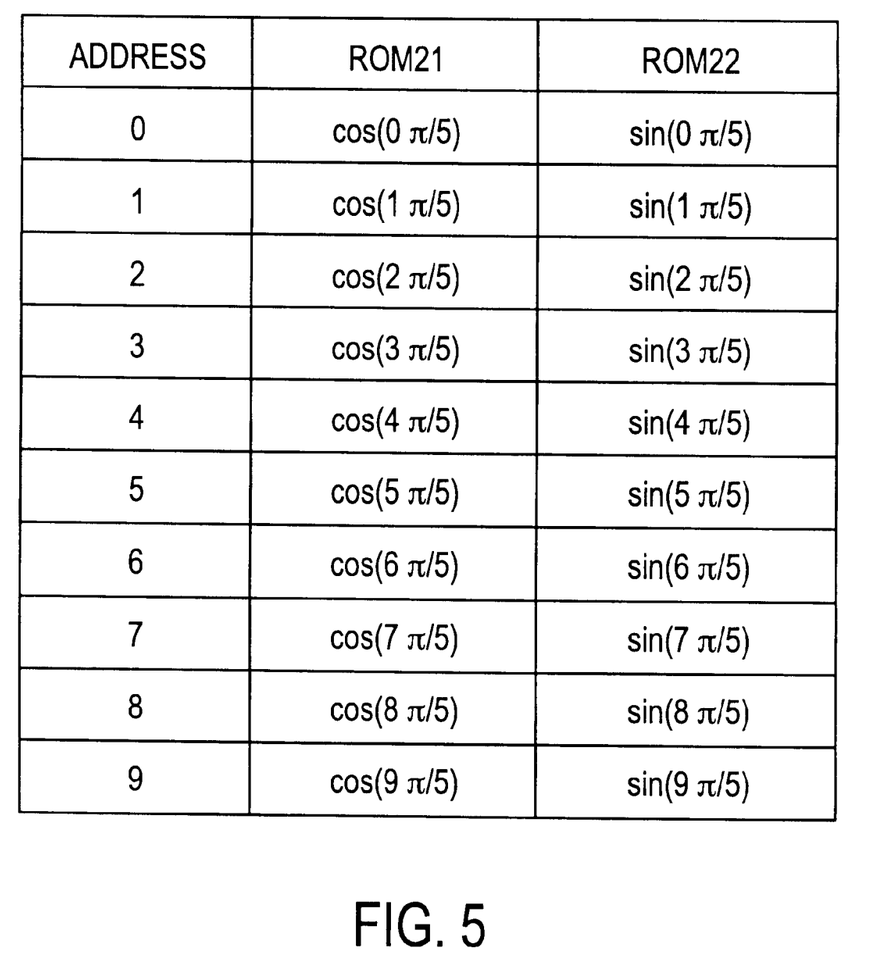
FIG. 5 is a table listing the data stored in read only memories of FIG. 4.

When the sampling rate of the A/D converters 4I and 4Q is $\omega_s/2\pi$ and $\omega_r=\omega_s/N$, where N is an integer greater than 1, the cosine generator 12 and the sine generator 13 of the first embodiment output only predetermined specific values. In the second embodiment of FIG. 4, the cosine generator 12 and sine generator 13 of FIG. 2 are replaced by a cosine ROM 21 and a sine ROM 22 respectively on condition that $\omega_r=\omega_s/N$, where N is an integer greater than 1. For example, if $\omega_r=\omega_s/N$, where N=10, the cosine ROM 21 and the sine ROM 22 can store the values listed in the ROM table shown in FIG. 5.

The frequency converter 5 according to the second embodiment performs the same function as the first embodiment when the cosine ROM 21 and the sine ROM 22 systematically and repeatedly output the values stored in the ROM table from address 0 to address 9.

Figure 6:
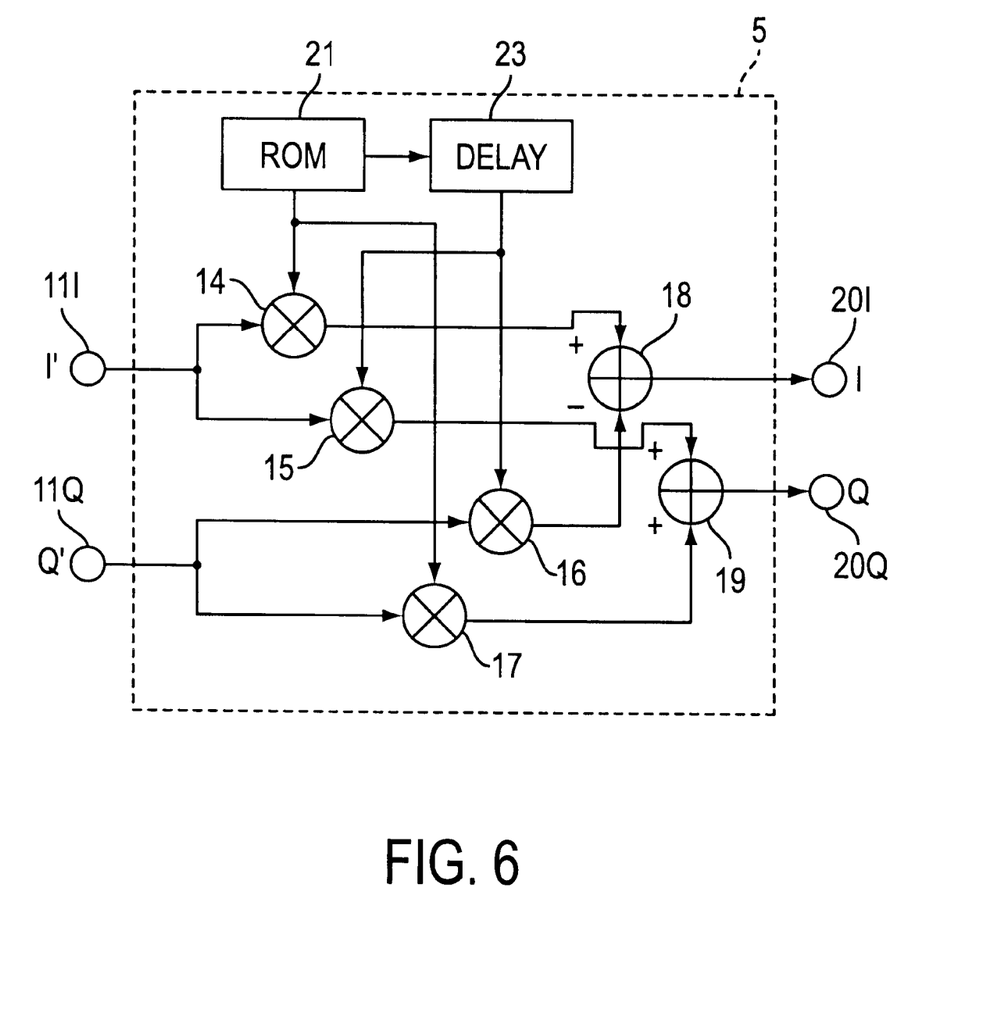
FIG. 6 is a block diagram showing a third embodiment of the frequency converter circuit.

FIG. 6 shows the circuit of a third embodiment of the frequency converter 5. The frequency converter of FIG. 6 according to the third embodiment differs from the second embodiment of FIG. 4 in that the frequency converter 5 has a delay circuit 23 instead of the sine ROM 22. The delay circuit 23 delays the output of cosine ROM 21 until the term of the predetermined sample corresponds to $\pi/2$.

Figure 7:
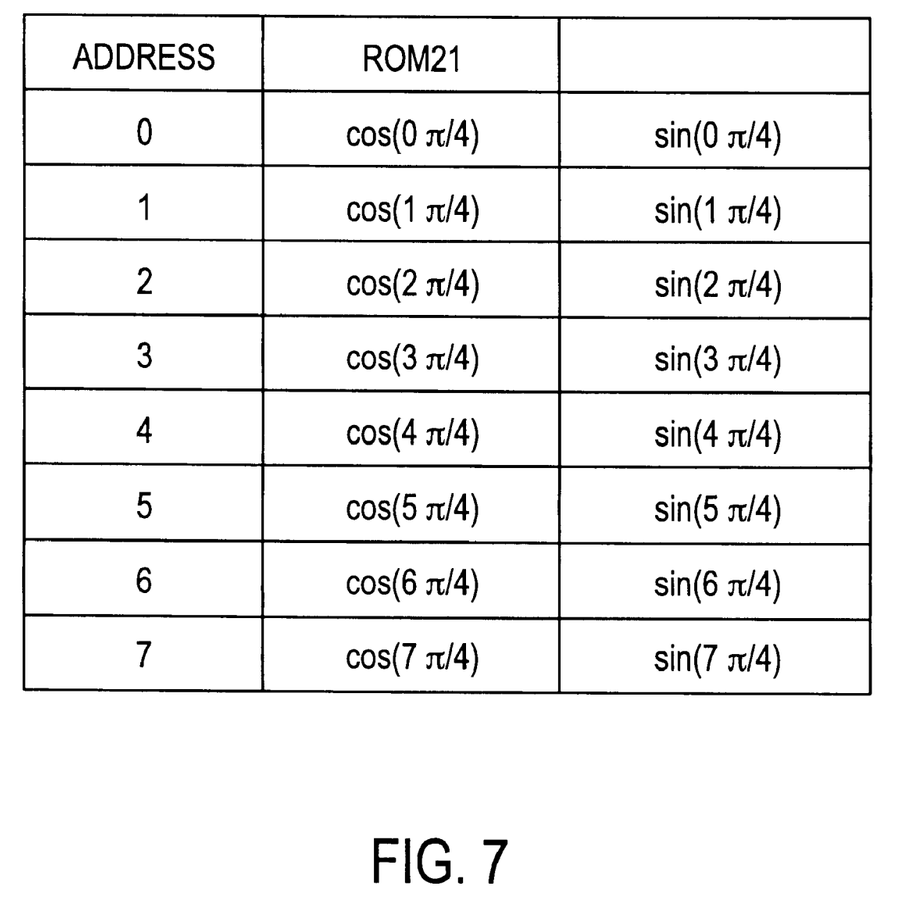
FIG. 7 is a table listing the data stored in a read only memory of FIG. 6.

When the sampling rate of the A/D converters 4I and 4Q is $107_s/2\pi$ and $\omega_r=\omega_s/4M$, where M is an integer greater than 0, the sine ROM 22 of the second embodiment outputs only particular values delayed until the term of the predetermined samples correspond to $\pi/2$. In the third embodiment, the sine ROM 22 is replaced by the delay circuit 23 on condition that $\omega_r=\omega_s/4M$, where M is an integer greater than 0. That is, the phase of the signal output by delay circuit 23, is delayed by $\pi/2$ in comparison with the output of ROM 21. For example, if N=4M=8, the cosine ROM 21 stores the predetermined values in the ROM tables, as shown in FIG. 7. The cosine ROM 21 periodically provides the outputs from address 0 to address 7 and then the delay circuit 23 delays the outputs for M=2 samples.

Figure 8:
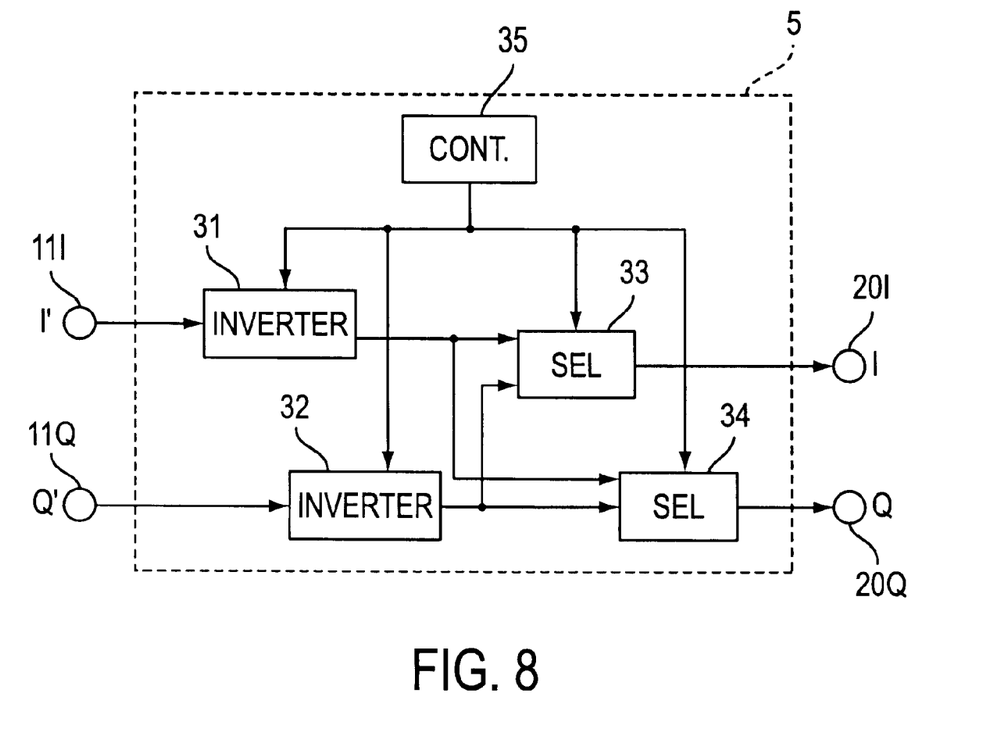
FIG. 8 is a block diagram showing a fourth embodiment of the frequency converter circuit.

As a result, the frequency converter 5 according to the third embodiment carries out the same frequency conversion function as the second embodiment but without the sine ROM 22. FIG. 8 shows the circuit of a fourth embodiment of the frequency converter 5. The frequency converter of FIG. 8 is provided with sign inverters 31 and 32, selectors 33 and 34 and a controller 35. The sign inverters 31 and 32 invert the sign (+ or −) of an input signal upon receiving an inversion signal provided by the controller 35 or, if there is no inversion signal, pass the input signal without inverting the sign of the signal. The selectors 33 and 34 select one of the signals output by the sign inverters 31 and 32 based on the control signal provided by the controller 35. The controller 35 controls the sign inverters 31 and 32 to invert the signs of the input signals and also controls the selectors 33 and 34 to select an output signal corresponding to phase information $\omega_r t$.

In the fourth embodiment of the invention, when the sampling rate is $\omega_s/2\pi$ and $\omega_r=\omega_s/4$ in the A/D converters 4I and 4Q, there are only four values of phase information $\omega_r t$. For example, phase information can be selected from the four values $0\pi/2$, $1\pi/2$, $2\pi/2$ and $3\pi/2$, shown in FIG. 9.

Figure 9:
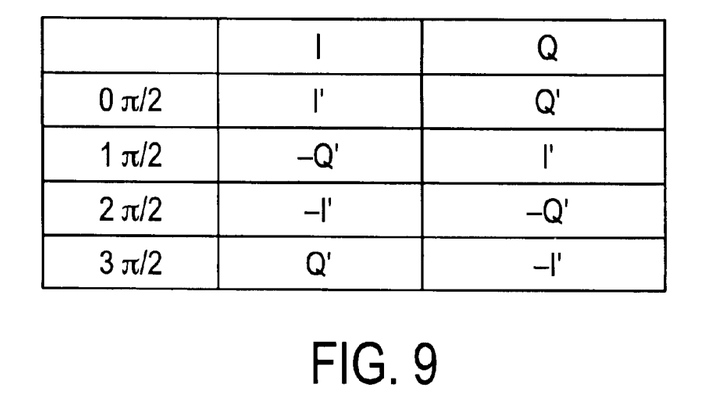
FIG. 9 is a table showing phase information descriptive of the fourth embodiment of the frequency converter.

In this case, when phase information $\omega_r t$ is $0\pi/2$, the controller 35 controls the sign inverter 31 to transmit the input signal I' (i.e. not invert the sign) and controls the sign inverter 32 to transmit the input signal Q' (i.e. not invert the sign). The controller 35 then controls the selector 33 to select the output signal I' of the sign inverter 31 and controls the selector 34 to select the output signal Q' of the sign inverter 32. When phase information $\omega_r t$ is $1\pi/2$, the controller 35 controls the sign inverter 31 to transmit the input signal I' (not invert the sign) and controls the sign inverter 32 to invert the sign of the input signal Q (invert the sign). And then the controller 35 controls the selector 33 to select the inverted output signal (−Q') of the sign inverter 32 and controls the selector 34 to select the output signal I' of the sign inverter 31. When phase information $\omega_r t=2\pi/2$, the controller 35 controls the sign inverter 31 to invert the sign portion of the input signal I' and controls the sign inverter 32 to invert the sign portion of the input signal Q'. And then the controller 35 controls the selector 33 to select the inverted output signal (−I') of the sign inverter 31 and controls the selector 34 to select the inverted output signal (−Q') of the sign inverter 32.

When the phase information $\omega_r t=3\pi/2$, the controller 35 controls the sign inverter 31 to invert the sign portion of the input signal I' and controls the sign inverter 32 to transmit the input signal Q'. And then the controller 35 controls the selector 33 to select the output signal (Q') of the sign inverter 32 and controls the selector 34 to select the inverted output signal (−I') of the sign inverter 31.

Figure 10:
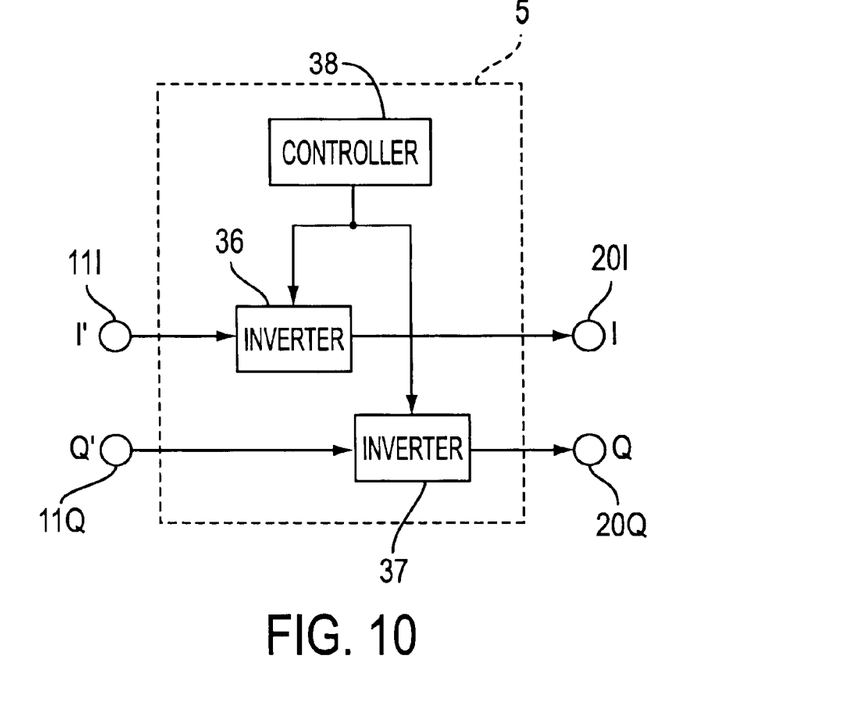
FIG. 10 is a block diagram showing a fifth embodiment of the frequency converter.
Figure 11:
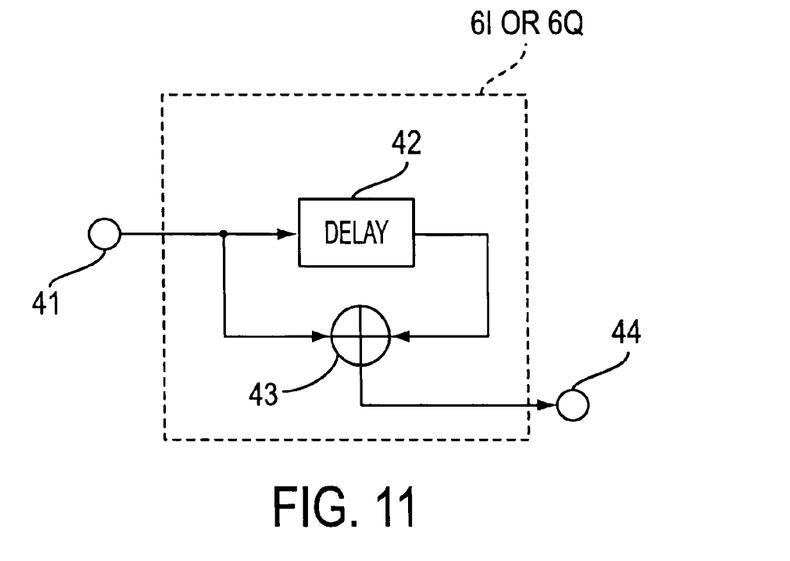
FIG. 11 is a block diagram showing the circuit of low-pass filters included in the fifth embodiment of the frequency converter.

In the fifth embodiment of the invention, the frequency converter 5 of FIG. 1 is shown in FIG. 10 and the low pass filter circuits 6I and 6Q of FIG. 1 are shown in FIG. 11. In FIG. 10, the frequency converter 5 has sign inverters 36 and 37 and a controller 38. The sign inverters 36 and 37 invert a sign (+ or −) of an input signal when an inversion signal is input by the controller 38 or passes through the input signal if there is no inversion signal. The controller 38 controls the sign inverters 36 and 37 to invert the sign of the input signals respectively in corresponding to phase information $\omega_r t$.

Figure 12:
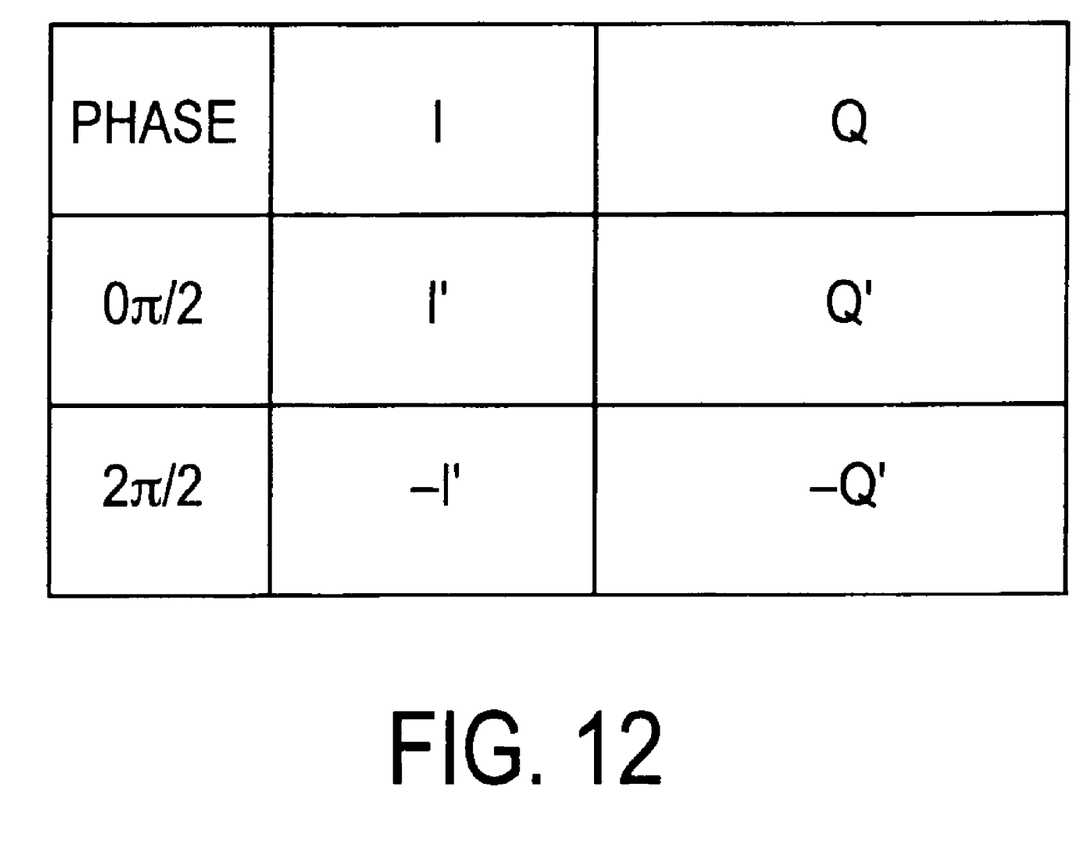
FIG. 12 is a table showing phase information descriptive of the fifth embodiment of the frequency converter of FIG. 10.

In the fifth embodiment, when the sampling rate of the A/D converters 4I and 4Q is $\omega_2/2\pi$ and $\omega_r=\omega_s/2$, there are only two types of phase information $\omega_r t$. For example, phase information can be selected from the two values $0\pi/2$ and $2\pi/2$, as shown in FIG. 12.

In this case, when the phase information $\omega_r t$ is $0\pi/2$, the controller 38 controls the sign inverter 36 to transmit the input signal I' (not inverting the sign) and controls the sign inverter 37 to transmit the input signal Q' (not inverting the sign). When phase information $\omega_r t$ is $2\pi/2$, the controller 38 controls the sign inverter 36 to invert the sign of the input signal I' and controls the sign inverter 37 to invert the sign portion of the input signal Q'.

As shown in FIG. 11, each of the low pass filters 6I and 6Q has an input terminal 41, a delay circuit 42, an adder 43 and an output terminal 44 when the sampling rate is $\omega_2/2\pi$ and $\omega_r=\omega_s/2$. That is, each of the low pass filters 6I and 6Q is a transversal filter with two taps. The in-phase and quadrature signals output from the frequency converter 5 are respectively supplied to the input terminal 41 of the low pass filters 6I and 6Q according to the fifth embodiment of the invention. The in-phase and quadrature signals are delayed until one sample period of the delay circuit 42 has expired. The delayed signals are added to the next signal provided by the input terminal 41 and are output to the output terminal 44.

While the present invention has been described with reference to the particular illustrative embodiments, it is not restricted by those embodiments. It is to be appreciated that those skilled in the art can change or modify the embodiments without departing from the scope thereof. For example, in all of the described embodiments, the received signal is converted to an IF signal only once.

However it is possible to convert the received signal to an IF signal step-by-step more than once. For example, the invention can be adapted to analog/digital convert the final IF signal, which has approximately the same angular frequency bandwidth as the baseband signal. It also can be adapted to an embodiment in which the received signal is converted to the first IF signal and the first IF signal is analog/digital converted to a first digital signal. The first digital signal is converted to a second digital signal with lower frequency bandwidth and the second digital signal is passed through the band pass filter.

What is claimed is:

1. A radio receiver providing compensation for a direct current offset including:
   a first frequency converting means for converting a signal received by the radio receiver to first and second intermediate frequency signals each having an angular frequency $\omega_r$, said first and second intermediate frequency signals being in phase quadrature with respect to each other;
   analog-to-digital converting means for converting said first and second intermediate frequency signals to first and second intermediate frequency digital signals each having said angular frequency $\omega_r$, said first and second intermediate frequency digital signals being in phase quadrature with respect to each other and including the direct current offset which is generated within said analog-to-digital converting means;
   second frequency converting means for converting said first and second digital signals and said direct current offset to first and second baseband signals, wherein said second frequency converting means includes:
      a cosine generator for generating cosine waveform having said intermediate frequency $\omega_r$,
      a sine generator for generating a sine waveform having said intermediate frequency $\omega_r$;
      a first multiplier for multiplying said cosine waveform and said first digital signal;
      a second multiplier for multiplying said sine waveform and said second digital signal;
      a subtractor for subtracting an output of said second multiplier from an output of said first multiplier and for outputting said first baseband signal;
      a third multiplier for multiplying said sine waveform and said first digital signal;
      a fourth multiplier for multiplying said cosine waveform and said second digital signal; and
      an adder for adding an output of said third multiplier and an output of said fourth multiplier and for outputting said second baseband signal; and
   low pas filtering means having a cutoff frequency $\omega_r$ for removing frequency components of said first and second baseband signals which are higher than $\omega_r$.

2. A radio receiver according to claim 1 wherein when a sampling rate of said analog-to-digital converting means is $\omega_s/2\pi$ and said intermediate frequency $\omega_r=\omega_s/N$, where N is an integer greater than 1, said cosine generator outputs a cosine waveform stored in a ROM table having a first predetermined value, and said sine generator outputs a sine waveform stored in a ROM table having a second predetermined value.

3. A radio receiver providing compensation for a direct current offset including:
   a first frequency converting means for converting a signal received by the radio receiver to first and second intermediate frequency signals each having an angular frequency $\omega_r$, said first and second intermediate frequency signals being in phase quadrature with respect to each other;
   analog-to-digital converting means for converting said first and second intermediate frequency signals to first and second intermediate frequency digital signals each having said angular frequency $\omega_r$, said first and second intermediate frequency digital signals being in phase quadrature with respect to each other and including the direct current offset which is generated within said analog-to-digital converting means;
   second frequency converting means for converting said first and second digital signals and said direct current offset to first and second baseband signals, wherein said second frequency converting means includes:
      a cosine ROM for storing a cosine waveform having said intermediate frequency $\omega_r$;
      a sine ROM for storing a sine waveform having said intermediate frequency $\omega_r$;
      a first multiplier for multiplying said cosine waveform and said first digital signal;
      a second multiplier for multiplying said sine waveform and said first digital signal;
      a subtractor for subtracting an output of said second multiplier from an output of said first multiplier and for outputting said first baseband signal;
      a third multiplier for multiplying said sine waveform and said first digital signal;
      a fourth multiplier for multiplying said cosine waveform and said second digital signal; and
      an adder for adding an output of said third multiplier and an output of said fourth multiplier and for outputting said second baseband signal; and
   low pas filtering means having a cutoff frequency $\omega_r$ for removing frequency components of said first and second baseball signals which are higher than $\omega_r$.

4. A radio receiver providing compensation for a direct current offset including:
   a first frequency converting means for converting a signal received by the radio receiver to first and second intermediate frequency signals each having an angular frequency $\omega_r$, said first and second intermediate frequency signals being in phase quadrature with respect to each other;
   analog-to-digital converting means for converting said first and second intermediate frequency signals to first and second intermediate frequency digital signals each having said angular frequency $\omega_r$, said first and second intermediate frequency digital signals being in phase quadrature with respect to each other and including the direct current offset which is generated within said analog-to-digital converting means;
   second frequency converting means for converting said first and second digital signals and said direct current offset to first and second baseband signals, wherein said second frequency converting means includes:

a cosine ROM for storing a cosine waveform having said intermediate frequency $\omega_r$;

a delay circuit coupled to said cosine ROM, said delay circuit delaying the output of said cosine ROM by $\pi/2$;

a first multiplier for multiplying said cosine waveform and said first digital signal;

a second multiplier for multiplying an output of said delay circuit and said second digital signal;

a subtractor for subtracting an output of said second multiplier from an output of said first multiplier and for outputting said first baseband signal;

a third multiplier for multiplying the output of said delay circuit and said first digital signal;

a fourth multiplier for multiplying said cosine waveform and said second digital signal; and an adder for adding an output of said third multiplier and an output of said fourth multiplier and for outputting said second baseband signal; and low pass filtering means having a cutoff frequency $\omega_r$ for removing frequency components of said first and second baseband signals which are higher than $\omega_r$.

5. A radio receiver providing compensation for a direct current offset including:

a first frequency converting means for converting a signal received by the radio receiver to first and second intermediate frequency signals each having an angular frequency $\omega_r$, said first and second intermediate frequency signals being in phase quadrature with respect to each other;

analog-to-digital converting means for converting said first and second intermediate frequency signals to first and second intermediate frequency digital signals each having said angular frequency $\omega_r$, said first and second intermediate frequency digital signals being in phase quadrature with respect to each other and including the direct current offset which is generated within said analog-to-digital converting means;

second frequency converting means for converting said first and second digital signals and said direct current offset to first and second baseband signals, wherein said second frequency converting means includes:

a controller; and first and second sign inverters coupled to said controller, said first and second sign inverters receiving said first and second digital signals respectively, the signs of said first and second digital signals at outputs of said first and second sign inverters being determined by said controller; the outputs of said first and second sign inverters outputting said first and second baseband signals; and low pass filtering means having a cutoff frequency $\omega_r$ for removing frequency components of said first and second baseband signals which are higher than $\omega_r$, wherein said low pass filtering means is a transversal filter.

6. A radio receiver according to claim 5 which further comprises first and second selectors coupled to said controller, said first and second selectors receiving the outputs of said first and second sign inverters and outputting said first and second baseband signals, the signs of said first and second baseband signals being determined by the output of said controller, a sampling rate of said analog-to-digital converting means being $\omega_s/2\pi$ and said intermediate frequency being $\omega_r=\omega_s/4$.

* * * * *